(12) United States Patent
Kettenacker

(10) Patent No.: US 7,909,734 B2
(45) Date of Patent: Mar. 22, 2011

(54) METHOD FOR OPERATING A VEHICLE

(75) Inventor: Guenter Kettenacker, Steinheim (DE)

(73) Assignee: Robert Bosch GmbH, Stuttgart (DE)

( * ) Notice: Subject to any disclaimer, the term of this patent is extended or adjusted under 35 U.S.C. 154(b) by 629 days.

(21) Appl. No.: 12/002,048

(22) Filed: Dec. 14, 2007

(65) Prior Publication Data

US 2008/0161157 A1 Jul. 3, 2008

(30) Foreign Application Priority Data

Dec. 14, 2006 (DE) .......................... 10 2006 059 080

(51) Int. Cl.
*B60W 10/18* (2006.01)
(52) U.S. Cl. ........................................ 477/186; 477/187
(58) Field of Classification Search .................... 477/92, 477/94, 184, 186, 187
See application file for complete search history.

(56) References Cited

U.S. PATENT DOCUMENTS

| | | | | |
|---|---|---|---|---|
| 5,915,801 A | * | 6/1999 | Taga et al. ...................... 303/152 |
| 5,927,415 A | * | 7/1999 | Ibaraki et al. .............. 180/65.25 |
| 7,211,028 B2 | * | 5/2007 | Matsumura ................... 477/124 |
| 7,597,651 B2 | * | 10/2009 | Hornbrook .................... 477/116 |
| 2008/0224478 A1 | * | 9/2008 | Tamor .......................... 290/40 C |

* cited by examiner

Primary Examiner — Ha D. Ho
(74) Attorney, Agent, or Firm — Kenyon & Kenyon LLP

(57) ABSTRACT

Vehicle operation is controllable and/or regulatable by specifying a driver request describing a setpoint rotational speed or a setpoint torque via an accelerator pedal, detecting the instantaneous position of the accelerator pedal and controlling and/or regulating the internal combustion engine such that the setpoint rotational speed or setpoint torque is achievable. To provide for a sustained-action brake to be easily operated in the vehicle, and increase the vehicle's range of use, one of possible braking actions of the vehicle is specified by selecting a determined position of the pedal. As a function of an instantaneously detected position of the accelerator pedal, the operation of the vehicle is controlled and/or regulated such that braking power specified via the accelerator pedal is achieved. A variation in the braking power specified via the accelerator pedal is also converted as continuously as possible to a corresponding braking power by suitably activating additional components or devices.

16 Claims, 2 Drawing Sheets

METHOD FOR OPERATING A VEHICLE

CROSS-REFERENCE TO RELATED APPLICATIONS

The present application claims priority to Application No. 10 2006 059 080.5, filed in the Federal Republic of Germany on Dec. 14, 2006, which is expressly incorporated herein in its entirety by reference thereto.

FIELD OF THE INVENTION

The present invention relates to a method for operating a vehicle, e.g., which includes an internal combustion engine, in which a driver request describing a setpoint rotational speed or a setpoint torque of the internal combustion engine is specified via an accelerator pedal, the instantaneous position of the accelerator pedal is detected, and the internal combustion engine is controlled and/or regulated such that the setpoint rotational speed or the setpoint torque is achievable.

The present invention also relates to a vehicle, e.g., which includes an internal combustion engine which is controllable and/or regulatable such that a setpoint rotational speed or a setpoint torque is achievable, the setpoint rotational speed or setpoint torque corresponding to a driver request which is specifiable via an accelerator pedal. The present invention also relates to a control unit for controlling and/or regulating the operation of a vehicle, as well as to a computer program which is executable on a computing device, in particular a control unit for controlling and regulating the operation of a vehicle.

BACKGROUND INFORMATION

To slow down a moving vehicle, for example a passenger car or commercial vehicle, so-called wheel brakes are customarily used. However, when used for a longer period of time, for example when driving down a mountain, wheel brakes of this type may become thermally overloaded, which may result in reduced braking action or a failure of the wheel braking system. The provision of a sustained-action braking device, which enables a longer-lasting braking action, is therefore known, in particular in the case of vehicles having a great total weight.

For example, a so-called engine braking system, whose braking power is achieved from a drag of an internal combustion engine and a braking power generated by throttling an exhaust gas flow in a discharge system, is known as a sustained-action braking device. An elevated braking power is achievable using so-called decompression engine brakes or so-called exhaust valve braking systems.

In certain conventional exhaust valve braking systems, the exhaust valve brake is usually activated or deactivated by the vehicle driver, using a switch. A method for selecting multiple predefined braking powers of the exhaust valve brake, using a step switch, is also conventional.

The exhaust valve brake is activatable only when the accelerator pedal is not in operation. The functionality of the accelerator pedal is deactivated via a selection logic when the exhaust valve brake is activated via the switch.

Certain conventional exhaust valve braking systems have the disadvantage that they are not easy to operate. Certain conventional exhaust valve braking systems also have the disadvantage that they do not provide the braking power to be achieved to be accurately specified.

SUMMARY

Example embodiments of the present invention provide a device by which the exhaust valve brake may be more easily operated and its range of applications expanded.

According to example embodiments of the present invention, one of multiple possible braking actions of the vehicle is specified by selecting a determined position of the accelerator pedal. As a function of an instantaneously detected position of the accelerator pedal, the vehicle is controlled and/or regulated such that the braking power specified via the accelerator pedal is achieved.

The desired braking power is not selected or specified by a switch or by a multi-step switch, but rather by operating the accelerator pedal already present in the vehicle in an appropriate manner. In this regard, a variation in the braking action specified via the accelerator pedal may be converted as continuously as possible to a braking power corresponding to the instantaneous position of the accelerator pedal.

The specified braking power is achieved by suitably activating the internal combustion engine and by suitably activating ancillary units associated with the internal combustion engine. In particular, one or more of the following options may be combined:

Deactivation of a fuel metering device
Deactivation of an ignition device
Reduction or increase of a boost pressure
Activation or deactivation of a decompression valve
Activation or deactivation of a retarder
Activation or deactivation of an exhaust valve
Activation or deactivation of an ancillary unit, in particular an electrical fan or an a/c compressor
Activation of electrical consumers, for example an increase or reduction in the power of a generator, activation or deactivation of an electrical fan or compressor.

By suitably combining the aforementioned factors influencing the braking action, it is possible to increase or reduce an instantaneous braking power as continuously as possible to achieve a specified braking power as accurately as possible.

For this purpose, the achievable braking power must be determined, for example, for all or a selected number of possible combinations of the aforementioned factors. A specified braking power is achieved by selecting the combination whose achievable braking power most closely approximates the requested braking power. Furthermore, an increase or reduction in an instantaneous braking power is achievable by at least temporarily implementing the transition from a first requested braking power to a second requested braking power via one or more of the possible intermediate steps, using a suitable control mechanism.

This makes it possible to specify a particularly large number of different possible braking powers, so that the latter provide the driver to nearly continuously increase or reduce the desired braking power via the accelerator pedal.

A braking action may be specified by the positions of the accelerator pedal within a first area of the possible pedal path, and the driver request is specified when the acceleration pedal is positioned within a second area of the possible pedal path. This makes it possible to specify a driver request describing a setpoint rotational speed or a setpoint torque as well as a desired braking action, using the accelerator pedal. This is done as a function of the instantaneous position of the accelerator pedal being situated within the first area of the possible pedal path or in the second area of the possible pedal path.

If a setpoint torque is specified, it is also suitable to determine a transition between the first area and the second area as a function of an instantaneous rotational speed. A more or less customary vehicle performance with reverse coupling is achievable thereby.

In particular, an increase in the regulatable torque is also achieved in that a braking power which represents not only a positive torque, but also a negative torque, is specifiable.

A specified braking action may be increased by moving the accelerator pedal in a first direction. A driver request to be specified is thus increased by the movement of the accelerator pedal in a second direction opposite from the first direction. This means, for example, that an instantaneously specified driver request may be continuously reduced by moving the accelerator pedal in one direction and, upon leaving the second area and entering the first area, an increasing braking power is specifiable by continuing to move the accelerator pedal in the same direction.

If the internal combustion engine is, for example, torque-controlled, this means that a torque request may be first reduced to zero, and negative torques corresponding to a desired braking action may be achieved by continuing to move the accelerator pedal in the same direction.

The control and/or regulation of the vehicle operation may change over from a first operating mode in which a braking action is not specifiable via the accelerator pedal to a second operating mode in which a braking action is specifiable via the accelerator pedal, as a function of at least one detected event. This event may be triggered by actuating a switch or pushbutton. The event may also be triggered by activating a wheel braking device.

Operating the vehicle in the first and the second operating modes makes it possible to control and/or regulate the vehicle in a customary manner by specifying a driver request, initially via the accelerator pedal. By changing over to the second operating mode, a desired braking power is additionally specifiable using the accelerator pedal, or a braking power is requested, for example by an existing speed regulator, if the actual speed is higher than the setpoint rotational speed.

When changing over from the first operating mode to the second operating mode, the setpoint rotational speed assigned to the relevant accelerator pedal position, or the setpoint torque assigned to the relevant accelerator pedal position, may be increased by a specifiable value.

This value represents a so-called offset value and ensures that an area of the possible accelerator pedal path is available for specifying the braking power. This second area of the possible accelerator pedal path is the area through which the accelerator pedal passes when it is first operated.

A first performance characteristic map may be used to control and/or regulate the vehicle operation in the first operating mode. A second performance characteristic map may be used to control and/or regulate the vehicle operation in the second operating mode. This provides for a vehicle to be retrofitted particularly easily so that the method hereof may be carried out by maintaining the originally existing control and/or regulation of the operation of the vehicle or the internal combustion engine in the first operating mode. A second performance characteristic map is used to implement the continuous specification of the desired braking power, the vehicle operation being controlled and/or regulated as a function of the second performance characteristic map when the vehicle is operated in the second operating mode.

The braking power may be controlled and/or regulated as a function of the instantaneous accelerator pedal position when the instantaneous driver request drops below an instantaneously detected actual torque or an instantaneously detected actual rotational speed, since it is assumed that the driver wishes to slow down the vehicle via a braking power corresponding to the instantaneous position of the accelerator pedal.

However, the braking power may be controlled and/or regulated only when the instantaneous driver request drops below an instantaneously detected actual torque or an instantaneously detected actual rotational speed by a specifiable threshold value. This provides for a particularly stable state transition between specifying a driver request and specifying a braking power.

Further features, possible applications and aspects of example embodiments of the present invention are described in more detail below with reference to the appended Figures.

DETAILED DESCRIPTION

Figure 1:
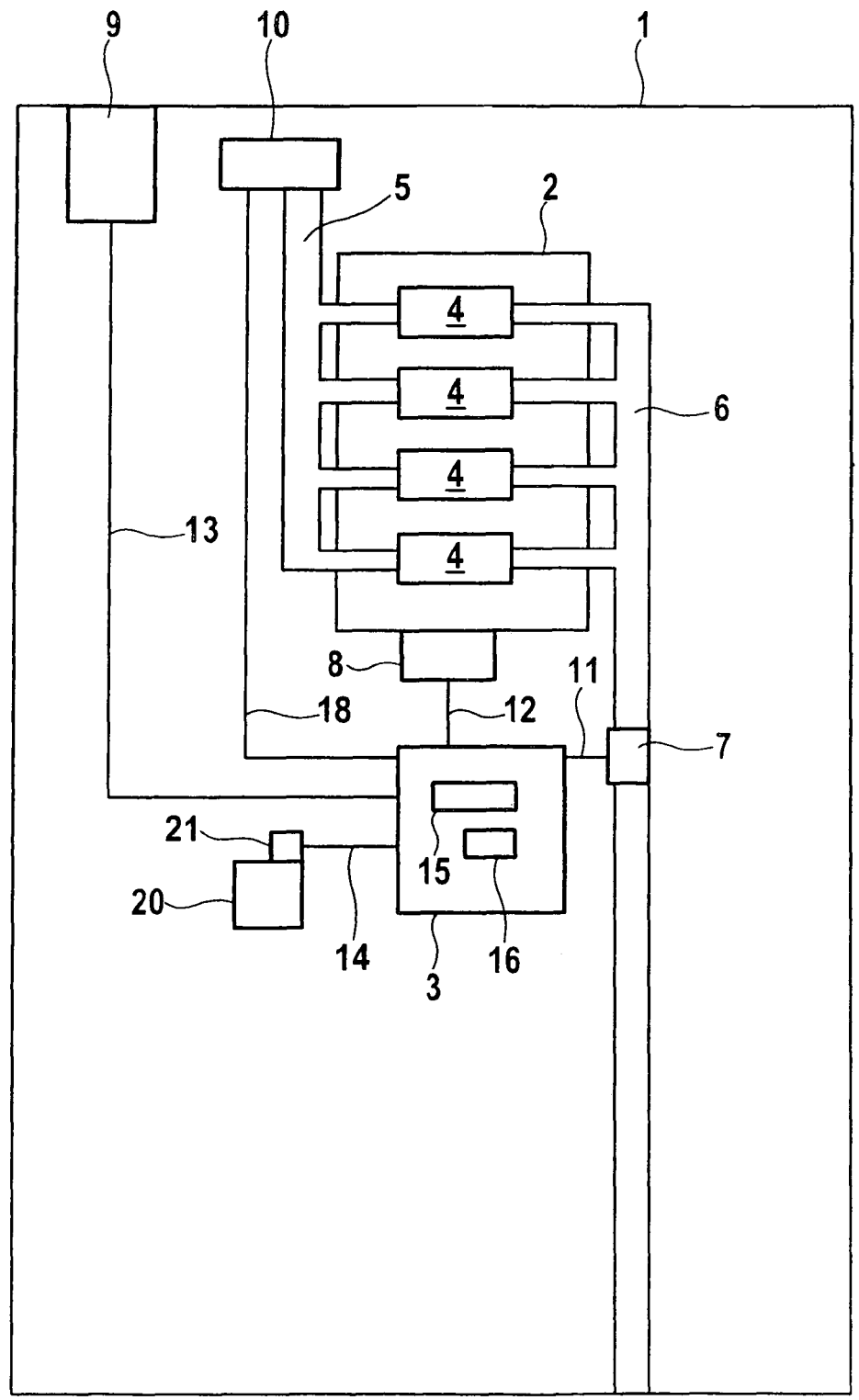
FIG. 1 is a schematic view of a vehicle having an internal combustion engine and a control unit which is configured to carry out a method according to example embodiments of the present invention.

FIG. 1 is a highly schematic view of a vehicle 1 which includes an internal combustion engine 2 and a control unit 3. Internal combustion engine 2 has cylinders 4. An air intake system 5 and an exhaust gas system 6 are connected to internal combustion engine 2. An exhaust valve 7, which is connected to control unit 3 via a signal line 11, is situated in exhaust gas system 6.

An a/c compressor 8, an electrical fan 9 and a supercharging unit 10 are also situated in vehicle 1. An accelerator pedal 20, to which a pedal valuator 21 is assigned, is also situated in vehicle 1. Supercharging unit 10 is arranged, for example, as an exhaust gas turbocharger or a compressor. Electrical fan 9 is arranged, for example, as a so-called radiator fan.

Control unit 3 includes a processor 15 and a memory element 16. For example, a computer program which is suitable for carrying out the method when the program runs on control unit 3 is stored in memory element 16, the individual process steps, for example, being processed by processor 15.

Control unit 3 is connected to a/c compressor 8, electrical fan 9, supercharging unit 10 and pedal valuator 21 via signal lines 12, 13, 14, 18, making it possible to control and/or regulate, in particular activate and deactivate, exhaust valve 7, a/c compressor 8, electrical fan 9 and supercharging unit 10 via control unit 3.

Figure 2:
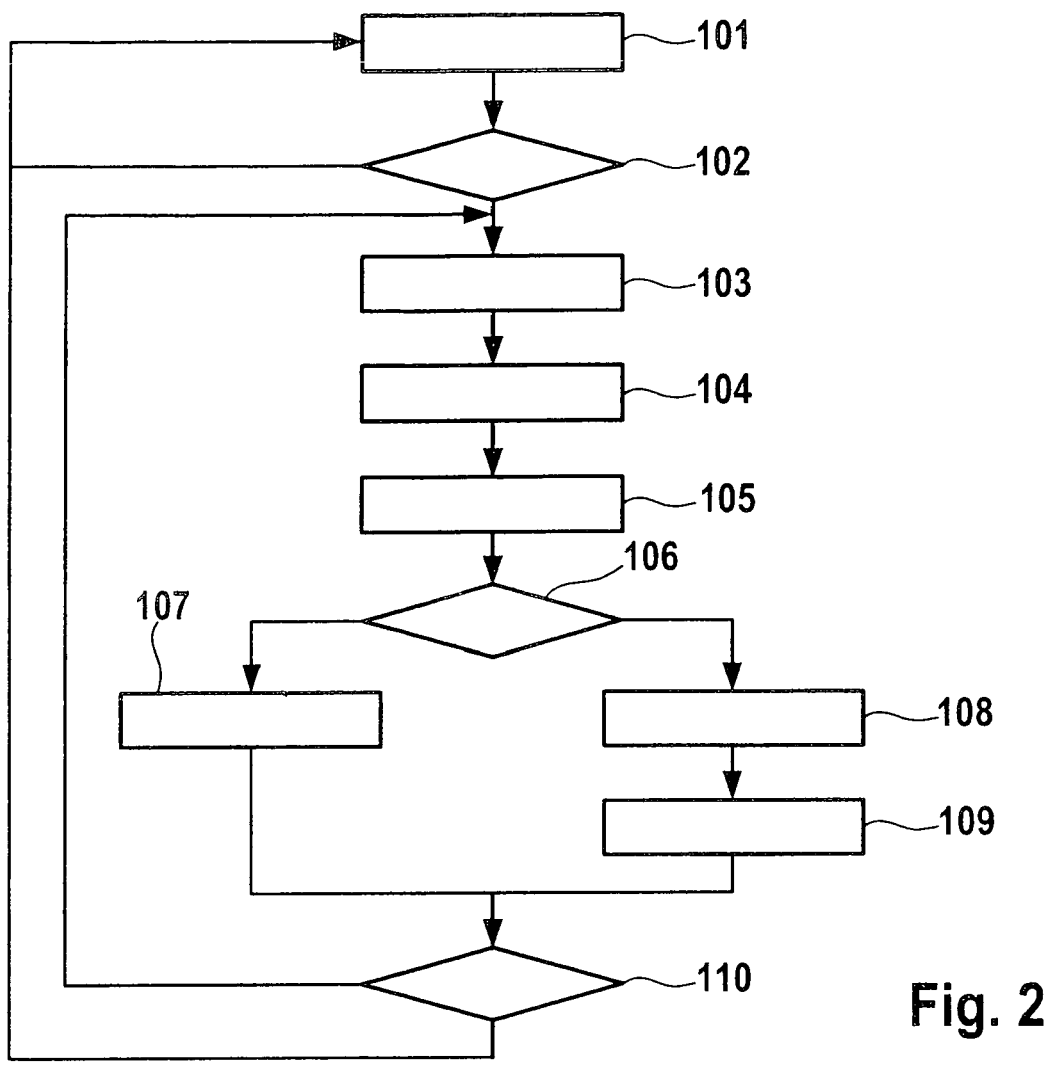
FIG. 2 is a schematic flowchart of a method according to an exemplary embodiment of the present invention.

A possible operation of vehicle 1 for carrying out the method is illustrated by way of example in the flowchart shown in FIG. 2.

The flow chart shown in FIG. 2 begins, for example, at 101 at which vehicle 1 is operated. e.g., in a conventional manner. For this purpose, internal combustion engine 2 is controlled and/or regulated, e.g., in a conventional manner, for example in a first operating mode.

The control and/or regulation system of internal combustion engine 2, hereinafter referred to as the engine controller, is used to set the torque generated by internal combustion engine 2. For this purpose, variables influencing torque or rotational speed are controlled and/or regulated in different subsystems of the engine controller. The subsystems include, for example, a charge control system which ascertains the required charge of cylinders 4 and, for example, opens a throttle valve accordingly. A mixture formation system in which a currently required fuel mass is calculated and the required injection time and optimum injection point are determined therefrom. An ignition system (only in the case of spark-ignition engines) in which the injection point is ascertained as a function of a so-called crank angle at which an air-fuel mixture introduced into cylinder 4 is to be ignited via a spark.

At 102, a check is carried out to see whether vehicle 1 is to be operated such that a desired braking power is specifiable via accelerator pedal 20. For example, the position of a switch which is actuatable by a driver in vehicle 1 may be detected for this purpose. It is also possible to detect an actuation of a brake pedal for this purpose and to conclude, in the event that the brake pedal is actuated, that the driver would like to specify a desired braking power during the subsequent operation of vehicle 1. If this is not the case, for example if the switch or the brake pedal is not actuated, the program branches back to 101.

Figure 3:
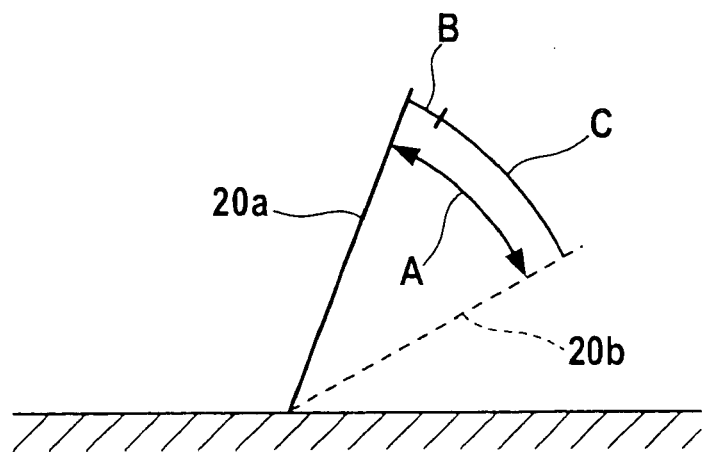
FIG. 3 is a schematic view of a possible pedal path and the division thereof into a first and a second range.

Otherwise, the method is continued to 103, in which a changeover from the first operating mode to a second operating mode is carried out. For example, the second operating mode differs from the first operating mode in that the driver may specify only one desired braking action using accelerator pedal 20. As illustrated schematically in FIG. 3, it is possible to specify a braking action via accelerator pedal 20 such that a desired braking power is specifiable in a first subrange A of possible pedal path A between a first position 20a and a second position 20b of accelerator pedal 20, and a setpoint rotational speed or a setpoint torque is additionally specifiable in a second subrange C. If, for example, the engine is controlled as a function of a first characteristic map, the engine or the operation of vehicle 1 is controllable via a second characteristic map at 103. In this case, the first characteristic map and the second characteristic map may be stored in control unit 3, for example in memory element 16.

The first characteristic map and the second characteristic map may be used to provide different parameters required for engine control or for controlling the operation of vehicle 1 to be selected as a function of an instantaneous position of accelerator pedal 20. The parameters assigned to the instantaneous position of accelerator pedal 20 then provide for internal combustion engine 2 or vehicle 1 to be controlled and/or regulated such that the specified rotational speed or the specified torque is achievable. By switching to the second characteristic map at 103, it is also possible to specify a desired braking power.

First subrange B corresponds, for example, to the area of pedal path A which is first traversed upon a first actuation of accelerator pedal 20. This means that a desired braking power may be specified by lightly actuating accelerator pedal 20. If accelerator pedal 20 moves to second subrange C, a driver request, for example a torque or a rotational speed, may be specified. If accelerator pedal 20 is situated in first subrange B, the specified braking power may be reduced the closer the position of accelerator pedal 20 comes to second subrange C. This provides for a particularly comfortable transition between specifying a setpoint torque or a setpoint rotational speed and specifying a desired braking power, since the desired braking power and the setpoint rotational speed or setpoint torque are each zero during the transition between subranges B and C, and upon moving farther into first subrange B, the requested braking power is increased, which, in turn, increases the specified setpoint torque or the specified setpoint rotational speed upon moving farther into second subrange C.

If accelerator pedal 20 is in a position within first subrange B, parameters which enable vehicle 1 or internal combustion 2 to be controlled and/or regulated such that the desired braking power is converted are ascertained via the second characteristic map.

For this purpose, the instantaneous position of accelerator pedal 20 is first ascertained in a step 104 by detecting a signal of pedal valuator 21 which is supplied to control unit 3 via signal line 14.

As a function of the instantaneous position of accelerator pedal 20 detected in step 104, the setpoint torque or setpoint rotational speed assigned to the instantaneous position is ascertained in a step 105. In this case, it is possible in particular to specify negative setpoint torques or setpoint rotational speeds which are interpretable as a desired braking power.

At 106, a check is carried out to see whether the specified setpoint rotational speed or the specified setpoint torque indicate the specification of a desired braking power. For this purpose, it is possible, for example, to check whether the specified setpoint rotational speed or the specified setpoint torque assumes a negative value. It is also possible to specify a threshold value and check whether a rotational speed or a torque which is less than the threshold value is specified by the detected position of accelerator pedal 20.

If this is not the case, control unit 3 triggers a control and/or regulation of the operation of vehicle 1 or the internal combustion engine in a step 107, providing for the desired setpoint rotational speed or the desired setpoint torque to be achieved or maintained. For example, internal combustion engine 2 is activated, e.g., in a conventional manner for this purpose.

However, if it is detected in step 106 that a braking power is desired, a strategy of how to achieve the desired braking power is ascertained at 108. For this purpose, for example, a characteristic map is used to determine the parameters required to activate internal combustion engine 2 and the ancillary units or other components achieving a braking action and thereby achieve the desired braking power. In particular, 108 is also used to ascertain which ancillary units are activatable in which manner to achieve the desired braking power as accurately as possible and/or as quickly as possible. For example, individual regulatable devices may thus be classified according to the thereby achievable braking power as well as according to the possible response time.

A combination of components or devices which provide for the braking power to be achieved is subsequently selectable at 108. A braking power may be achieved, for example, by activating a so-called overrun fuel cutoff in which a fuel metering system is deactivated. A braking power may also be achieved by suitable activation of exhaust valve 7, electrical fan 9, supercharging unit 10, a/c compressor 8, an ignition apparatus of a decompression valve or a retarder. In principle, any connectable ancillary unit or any connectable electrical consumer may be used to achieve a desired braking power.

AT 109, the operation of vehicle 1 or internal combustion engine 2 is controlled such that the specified braking power is achieved as accurately as possible. In particular, the selected components or devices are thus activated accordingly.

At 110, a check is carried out to see whether a braking power should no longer be specified for the time being during further operation. This may be determined, for example, in that the driver has actuated a switch or a pushbutton. If this is the case, the program branches to step 101 in which vehicle 1 or internal combustion engine 2 is again operated as a function of the first characteristic map, i.e., with regard to regulation strategies. If this is not the case, and if a braking power should consequently continue to be specifiable via accelerator pedal 20, a branch back to 104 is carried out.

The example embodiment illustrated by way of example in FIG. 2 may be implemented by changing individual method steps or modified combinations of individual method steps in example embodiments which are modified thereby. For example, it is possible to always control and/or regulate vehicle 1 or internal combustion engine 2 such that a braking power is specifiable via accelerator pedal 20. In this case, 101, 102, 103 and 110 could be omitted.

Example embodiments of the present invention therefore provide that—at least in one operating mode—a setpoint torque or a setpoint rotational speed as well as a braking power are specifiable via the accelerator pedal, the braking power also being able to be detected as a negative setpoint torque or a low setpoint rotational speed for a possible regulator. This also enables the regulatable torque range to be increased, since the method hereof thus also makes it possible to regulate negative torques which are implemented via a braking power.

What is claimed is:

1. A method for operating a vehicle, comprising:
   specifying a driver request describing at least one of (a) a setpoint rotational speed and (b) a setpoint torque via an accelerator pedal;
   detecting an instantaneous position of the accelerator pedal; and
   at least one of (a) controlling and (b) regulating an internal combustion engine such that the at least one of (a) the setpoint rotational speed and (b) the setpoint torque is achieved;
   wherein, by selecting a determined position of the accelerator pedal, one of multiple possible braking powers of the vehicle is specified, and an operation of the vehicle is at least one of (a) controlled and (b) regulated such that the braking power corresponding to the instantaneous position of the accelerator pedal is achieved.

2. The method according to claim 1, wherein the operation of the vehicle is at least one of (a) controlled and (b) regulated such that a variation in the braking power specified via the accelerator pedal is continuously converted to a braking power corresponding to the instantaneous position of the accelerator pedal.

3. The method according to claim 1, wherein, to achieve the braking power at least one of:
   (a) a fuel metering device is deactivated;
   (b) an ignition device is deactivated;
   (c) a boost pressure is varied;
   (d) a decompression valve is activated;
   (e) a retarder is activated;
   (f) an exhaust valve is activated;
   (g) an ancillary unit is connected; and
   (h) an electrical consumer is connected.

4. The method according to claim 1, wherein the braking power is specified via the accelerator pedal when the accelerator pedal is situated in a position within a first range of a possible pedal path, and the driver request describing the at least one of (a) the setpoint rotational speed and (b) the setpoint torque is specified via the accelerator pedal when the accelerator pedal is situated in a position within a second range of the possible pedal path.

5. The method according to claim 4, wherein at least one of (a) the first range, (b) the second range, and (c) a transition between the first range and the second range is determined as a function of an instantaneous rotational speed.

6. The method according to claim 1, wherein increase in a specified braking power is achieved by a movement of the accelerator pedal in a first direction, and increase in a driver request to be specified is achieved by a movement of the accelerator pedal in a second direction opposite from the first direction.

7. The method according to claim 1, wherein a braking power is not specifiable via the accelerator pedal in a first operating mode for at least one of (a) controlling and (b) regulating the operation of the vehicle, a braking power is specifiable in a second operating mode for at least one of (a) controlling and (b) regulating the operation of the vehicle and a changeover between the first and the second operating mode is carried out as a function of at least one detected event.

8. The method according to claim 7, wherein the event is triggered by at least one of (a) actuating a switch and (b) activating a wheel braking device.

9. The method according to claim 7, further comprising:
   when changing over from the first operating mode to the second operating mode, increasing at least one of (a) a setpoint rotational speed and (b) a setpoint torque assigned to a position of the accelerator pedal.

10. The method according to claim 7, wherein the operation of the vehicle is at least one of (a) controlled and (b) regulated in the first operating mode as a function of a first performance characteristic map, and the operation of the vehicle is at least one of (a) controlled and (b) regulated in the second operating mode as a function of a second performance characteristic map.

11. The method according to claim 1, wherein the at least one of (a) regulation and (b) control of the operation of the vehicle to achieve a specified braking power is at least one of (a) controlled and (b) regulated as a function of the position of the accelerator pedal when at least one of:
   (a) the instantaneous driver request drops below at least one of (a) an instantaneously detected actual torque and (b) an instantaneously detected actual rotational speed; and
   (b) the instantaneous driver request drops below at least one of (a) an instantaneously detected actual torque and (b) an instantaneously detected actual rotational speed by a specifiable threshold value.

12. A vehicle, comprising:
   an internal combustion engine at least one of (a) controllable and (b) regulatable as a function of a driver request specifiable via an accelerator pedal; and
   an arrangement configured to perform a method for operating the vehicle, the method including:
   specifying a driver request describing at least one of (a) a setpoint rotational speed and (b) a setpoint torque via an accelerator pedal;
   detecting an instantaneous position of the accelerator pedal; and
   at least one of (a) controlling and (b) regulating an internal combustion engine such that the at least one of (a) the setpoint rotational speed and (b) the setpoint torque is achieved;
   wherein, by selecting a determined position of the accelerator pedal, one of multiple possible braking powers of the vehicle is specified, and an operation of the vehicle is at least one of (a) controlled and (b) regulated such that the braking power corresponding to the instantaneous position of the accelerator pedal is achieved.

13. A control unit for at least one of (a) controlling and (b) regulating operation of a vehicle, wherein the control unit is configured to perform a method for operating the vehicle, the method including:
   specifying a driver request describing at least one of (a) a setpoint rotational speed and (b) a setpoint torque via an accelerator pedal;

detecting an instantaneous position of the accelerator pedal; and at least one of (a) controlling and (b) regulating an internal combustion engine such that the at least one of (a) the setpoint rotational speed and (b) the setpoint torque is achieved;

wherein, by selecting a determined position of the accelerator pedal, one of multiple possible braking powers of the vehicle is specified, and an operation of the vehicle is at least one of (a) controlled and (b) regulated such that the braking power corresponding to the instantaneous position of the accelerator pedal is achieved.

14. A computer-readable medium storing a computer program which when executed by a processor performs a method for operating a vehicle, the method including:

specifying a driver request describing at least one of (a) a setpoint rotational speed and (b) a setpoint torque via an accelerator pedal;

detecting an instantaneous position of the accelerator pedal; and at least one of (a) controlling and (b) regulating an internal combustion engine such that the at least one of (a) the setpoint rotational speed and (b) the setpoint torque is achieved;

wherein, by selecting a determined position of the accelerator pedal, one of multiple possible braking powers of the vehicle is specified, and an operation of the vehicle is at least one of (a) controlled and (b) regulated such that the braking power corresponding to the instantaneous position of the accelerator pedal is achieved.

15. The computer-readable medium according to claim 14, wherein the processor is included in a control unit configured to at least one of (a) control and (b) regulate operation of the vehicle.

16. The computer-readable medium according to claim 14, wherein the computer-readable medium includes at least one of (a) memory element, (b) a random access memory, (c) a read-only memory, (d) a flash memory, (e) an optical storage medium, and (f) a magnetic storage medium.

* * * * *